Oct. 1, 1940.   D. W. GEHRON   2,216,410
HOG FEEDER
Filed June 30, 1939
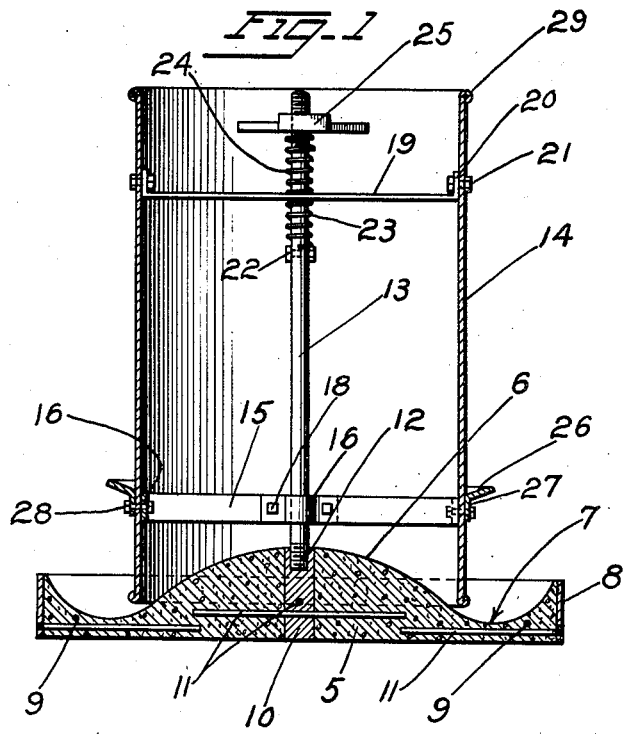
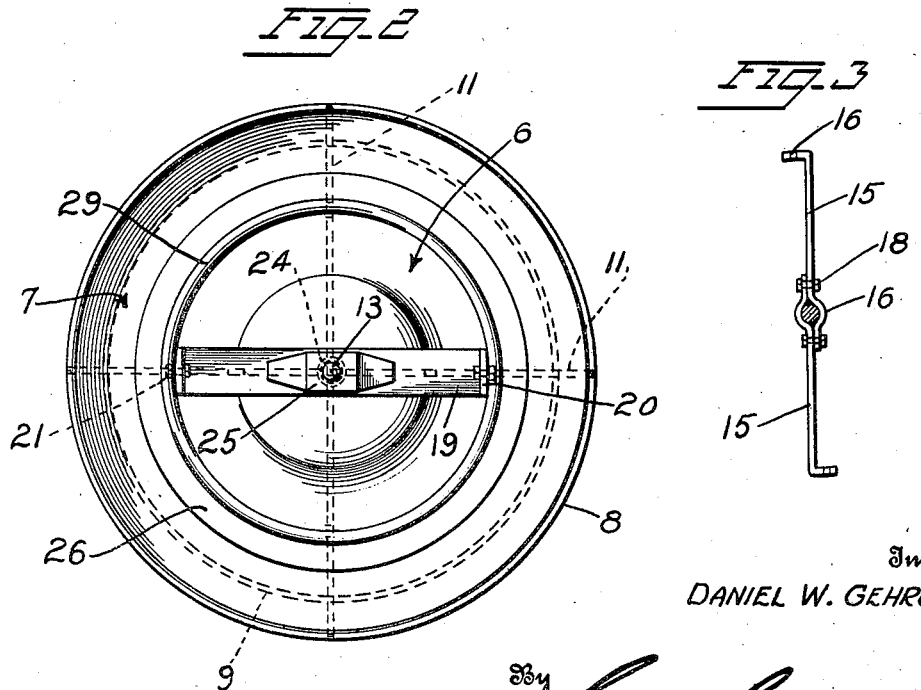
Inventor
DANIEL W. GEHRON
By Lacey & Lacey,
Attorneys Patented Oct. 1, 1940

2,216,410

UNITED STATES PATENT OFFICE 2,216,410

HOG FEEDER

Daniel W. Gehron, North Star, Ohio

Application June 30, 1939, Serial No. 282,291

4 Claims. (Cl. 119—53.5)

This invention relates to animal feeders and more particularly to a device especially designed for feeding hogs.

The object of the invention is to provide a hog feeder of simple and inexpensive construction in which the feed is automatically supplied to the feed trough whenever an animal pushes upwardly on the feed magazine.

A further object of the invention is to provide a hog feeder including a yieldably supported feed cylinder or magazine having its lower end fitting within a feed trough and provided with an exterior circumferential flange actuated by upward pressure exerted thereon by a hog to vary the amount of feed delivered into the feed trough.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a vertical sectional view of a hog feeder embodying the present invention, Figure 2 is a top plan view, and Figure 3 is a detail view of one of the braces of the feed magazine detached.

The improved hog feeder forming the subject-matter of the present invention comprises a supporting base 5 preferably molded or otherwise formed from cement or similar material and having a central dome portion 6 and an outer concave portion 7, the latter constituting a feed trough. The base 5 is surrounded by a metallic band 8 and extending inwardly from said band are reinforcing rods 9 embedded in the cement, as shown. Embedded in the base 5 at the center of the dome-shaped portion 6 is an anchoring member 10 provided with intersecting reinforcing rods 11, the outer ends of which preferably overlap the ends of the rods 9 so that the entire base 5 will be reinforced and strengthened. Formed in the upper end of the anchoring member 10 is a socket 12, the walls of which are threaded for engagement with the correspondingly threaded end of a vertical rod 13 on which is yieldably mounted for vertical sliding movement a feed magazine or cylinder, indicated at 14. The cylinder 14 is mounted on the rod 13 by means of a lower sectional brace 15 provided with angular attaching flanges 16. The inner ends of the brace sections are offset at 16 to loosely receive the rod 13 and are rigidly secured together by bolts or similar fastening devices 18. Spaced from the lower brace 15 is an upper bar or brace 19 having a central opening formed therein for the reception of the rod 13 and provided with terminal attaching flanges 20 secured to the cylinder 14 by bolts 21. The rod 13 is provided with a transverse bolt or stop 22, and interposed between said stop 22 and the upper bar 19 is a coiled spring 23. Arranged above the bar 19 and resting thereon is a similar coiled spring 24, the tension of which may be regulated by a bar nut 25 threaded on the upper end of the rod 13, as shown. It will thus be seen that the feed magazine or cylinder 14 is yieldably supported for sliding movement on the rod 13 and that the tension of the springs 22 and 24 may be varied by adjusting the bar nut 25.

Secured to the exterior of the feed magazine or cylinder 14 is a circumferential flange 26 provided with a depending skirt 27 and extending through said skirt and the terminal flanges 16 of the lower brace 15 are bolts 28 which serve the dual function of holding the flange 26 in position on the outside of the cylinder 14 and the lower brace 15 in contact with the inner surface of said cylinder. The flange 26 is inclined upwardly and laterally and overhangs the feed trough 7 so that, when a hog or other animal presses upwardly on the flange 16, the feed magazine or cylinder 14 will be forced upwardly against the tension of the spring 24 and thus regulate the amount of feed flowing downwardly from the dome-shaped portion 6 of the base into the feed trough 7. The metal at the upper and lower edges of the cylinder 14 is preferably bent to form reinforcing beads 29 and also to prevent injury to a hog or other animal feeding from the trough.

In operation, the cylinder or magazine 14 is filled or partially filled with feed and the lower edge of said cylinder spaced from the base 5 a sufficient distance to allow a small quantity of feed to flow from the magazine into the trough 7 and thus prevent wasting of said feed. If a hog is not satisfied with the quantity of feed in the trough 7, the animal will push upwardly on the flange 26, thereby elevating the cylinder against the tension of the springs and allowing additional feed to enter the trough. As soon as the pressure is removed from the flange 26, the coiled springs will automatically return the lower edge of the cylinder 14 to normal position so that there is no wasting of the feed.

The device is very simple in construction and may be made in different sizes and shapes without departing from the spirit of the invention.

Having thus described the invention, what is claimed as new is:

1. A hog feeder including a base having a central substantially dome-shaped portion and provided with a circumferential feed trough, an anchoring member fitted in the dome-shaped portion of the base, a rod engaging said anchoring member, a feed cylinder extending within the trough, upper and lower braces disposed within the cylinder and loosely receiving the rod, coiled springs surrounding the rod, a bar nut threaded on the rod for regulating the tension of the springs, and an animal actuated flange secured to the exterior of the cylinder in spaced relation to said feed trough.

2. A hog feeder including a concrete base having a central dome-shaped portion and provided with an annular concave feed trough surrounding said dome-shaped portion, a metallic ring fitted around the base and provided with inwardly extending reinforcing rods embedded in the concrete, an anchoring member seated in the dome-shaped portion of the base and provided with a threaded socket, a rod having its lower end threaded in said socket and its upper portion provided with terminal threads, a feed cylinder surrounding the rod and extending within the feed trough, an upper brace secured to the interior walls of the feed cylinder and provided with an opening for the reception of the rod, a stop formed on said rod, a coiled spring interposed between the stop and one side of the upper brace, a bar nut engaging the terminal threads on the rod, a coiled spring interposed between said bar nut and the upper surface of the upper brace, a lower brace having a socket slidably receiving the rod and provided with terminal attaching flanges, an animal actuated flange secured to the exterior of the feed cylinder in spaced relation to the feed trough, and fastening devices extending through said exterior flange and through the terminal flanges on the lower brace.

3. A hog trough comprising a substantially dome-shaped base, a circumferential feed trough, an anchoring member embedded in the base and provided at its upper end with a socket, intersecting reinforcing rods secured to the anchoring member and embedded in the dome-shaped portion, a reinforcing ring surrounding the trough, rods extending from said reinforcing ring and embedded in the base with their inner ends overlapping the first-mentioned reinforcing rods, a rod fitted within the socket of the anchoring member, a feed cylinder slidably mounted for vertical movement on the rod, means for normally and yieldably holding the lower end of the cylinder in spaced relation to the feed trough, and an animal actuated flange secured to the exterior of the feed cylinder and adapted to be pressed upwardly to allow the feed in said cylinder to flow over the dome-shaped portion into the feed trough.

4. A feed trough comprising a concrete base having a central dome-shaped portion and an annular feed trough, a reinforcing ring surrounding the base, rods extending inwardly from the ring and embedded in the concrete, an anchoring member seated in the dome-shaped portion and provided with a socket, intersecting reinforcing rods carried by the anchoring member and embedded in the dome-shaped portion of the base, a rod fitted in the socket of the anchoring member, a yieldably supported feed cylinder, a lower brace loosely fitting around the rod and having its ends provided with terminal flanges bearing against the interior of the cylinder, an upper brace having a central opening receiving the rod and provided with terminal flanges, bolts extending through said terminal flanges and said feed cylinder, a stop secured to the rod, a bar nut threaded on the upper end of the rod, coiled springs interposed between the stop and upper brace and bar nut respectively, and an outwardly and upwardly inclined animal actuated flange secured to the exterior of the feed cylinder and provided with a depending skirt and bolts extending through said skirt and the adjacent flanges on the lower brace and securing the parts together.

DANIEL W. GEHRON.